United States Patent [19]

Weingold et al.

[11] Patent Number: 4,726,737
[45] Date of Patent: Feb. 23, 1988

[54] REDUCED LOSS SWEPT SUPERSONIC FAN BLADE

[75] Inventors: Harris D. Weingold, West Hartford; Walter B. Harvey, South Glastonbury, both of Conn.

[73] Assignee: United Technologies Corporation, Hartford, Conn.

[21] Appl. No.: 924,007

[22] Filed: Oct. 28, 1986

[51] Int. Cl.⁴ ............................................. B63H 1/26
[52] U.S. Cl. ........................ 416/223 A; 416/DIG. 2
[58] Field of Search ............... 416/223 R, 228, 223 A, 416/DIG. 2

[56] References Cited

U.S. PATENT DOCUMENTS

| | | | |
|---|---|---|---|
| 2,043,736 | 6/1936 | Charavay | 416/DIG. 2 |
| 2,258,795 | 10/1941 | New | 416/DIG. 2 |
| 4,047,841 | 9/1977 | Laurin | 416/223 R |
| 4,431,376 | 2/1984 | Lubenstein et al. | 416/DIG. 2 |
| 4,569,631 | 2/1986 | Gray | 416/DIG. 2 |

FOREIGN PATENT DOCUMENTS 266475  7/1976  U.S.S.R. .................. 416/DIG. 2

Primary Examiner—Robert E. Garrett
Assistant Examiner—John T. Kwon
Attorney, Agent, or Firm—Troxell K. Snyder

[57] ABSTRACT

A swept leading edge blade (10) rotates in a stream of air (26) and experiences supersonic relative air velocities over at least a portion of the blade surface. The maximum camber points (28, 40) of adjacent blade segments (20, 18) are located to prevent intensification of the compression wave generated by each segment (20, 18).

2 Claims, 4 Drawing Figures

REDUCED LOSS SWEPT SUPERSONIC FAN BLADE

FIELD OF THE INVENTION

The present invention relates to a fan or compressor blade having supersonic airflow over at least a portion of the blade span.

BACKGROUND

The occurrence of supersonic flow over a portion of a rotating compressor or fan blade is a phenomenon which is familiar to those skilled in the art of aircraft propulsion system design. Relative flow velocity is a function of the engine nacelle or inlet through flow velocity, the angular velocity of the rotating blade, and the radial distance between the blade region under consideration and the axis of rotation.

Prior art blade designers have recognized the flow disruption which results from such relative supersonic flow, and, in particular with respect to noise generation, have specified blade leading and trailing edge shapes responsive to the supersonic flow conditions which attempt to minimize the occurrence of sonic shock waves in the vicinity thereof. One such blade design is shown in U.S. Pat. No. 3,989,406 issued Nov. 2, 1976 to Bliss. The Bliss reference shows a rotor blade wherein the leading edge of that portion of the blade subject to supersonic relative airflow velocities is swept axially forward or rearward behind a Mach cone defined at each point along the blade leading edge. This critical skewing or sweeping of the blade leading edge results in the component of the relative airflow velocity normal to the leading edge of the blade having a Mach number less than 1 and therefore falling in the subsonic flow regime. The Bliss design is intended to prevent leading edge shock waves from forming thereby reducing shock related noise generation by the rotating blades.

Bliss also discusses the problem of the formation of pressure waves adjacent the shroud wall surrounding the rotating blades. These shroud wall pressure waves interact with the airflow over the blade tips and can result in a second shock wave in the vicinity of the rotating blade tips. Bliss further shows a method and means for reducing such shroud-tip interaction by contouring the shroud wall along the natural streamline deflection over the suction surface of the blade tip.

A related blade design is disclosed in U.S. Pat. No. 4,012,172 issued Mar. 15, 1977 to Schwaar et al. The Schwaar reference shows a noise reducing fan blade design wherein the leading edge of the blade is swept forwardly from the blade hub to a point at the blade midspan and then swept rearwardly to the blade tip. The leading edge sweep is, for that portion of the blade subject to supersonic relative airflow velocities, shaped to fall within the Mach cone of the upstream adjacent leading edge points, thus achieving the subsonic normal velocity component indicated in the Bliss reference. Schwaar also describes a method for configuring such blades to minimize internal blade bending and attachment stresses by balancing the centers of gravity of the successive blade transverse segments about the attachment radius such that radial forces induced by the movement of the blade about the rotation axis are substantially balanced.

Finally, U.S. Pat. No. 4,358,246 issued Nov. 7, 1982 to Hanson et al also shows the contouring of a supersonic prop fan blade so that both the leading and trailing edges of the blade are swept behind their corresponding Mach surfaces. The pressure spike induced in prior art blades by the trailing wave is thus minimized along with the noise generation resulting therefrom.

The prior art blade designs thus discussed have been directed toward minimizing the noise generation which can occur in the case of improperly designed supersonic fan blades. Such noise reducing designs as are present in the prior art, while effective in reducing leading and trailing edge shock waves, do not address the occurrence of a strong compression wave front at the suction surface of a supersonic blade intermediate the leading and trailing edges. The compression wave front is the result of the recompression of the air stream flowing over the suction surface of the fan blade as the local airflow ceases its relative acceleration with respect to the blade surface and begins to decelerate adjacent that portion of the blade which lies downstream of the point of maximum blade camber.

As airflow relative velocity decreases, the static air pressure rises from the minimum value which occurs coincident with the maximum relative airflow velocity. This increase in pressure forms a pressure wave which, reinforced by the pressure waves of adjacent points along the blade suction surface, contributes to the creation of a rapid static pressure jump wherein the pressure gradient at the blade surface rises too rapidly to permit smooth flow in the boundary layer downstream thereof. This strong compression wave front induced by the reinforced compression waves at the surface of the blade detaches and disrupts the downstream blade surface boundary layer, resulting in flow recirculation and other irreversible losses which diminish overall blade performance by both increasing blade drag and decreasing the amount of airflow turning or static pressure rise achieved.

Prior art supersonic blade designs have attempted to delay such separation and its deleterious performance effects by shaping the transverse cross section of individual blade segments such that the point of maximum blade camber is located toward the trailing edge of the blade, with the exact location for each blade section based on prior state of the art unswept blade cascade test data correlations. The separation of the boundary layer which occurs due to the recompression of the flowing air downstream of the maximum blade camber point is thus able to act on only a small portion of the blade suction surface.

The prior art technique, while effective to a degree, does not eliminate the disruption of the boundary layer and the resulting inefficiencies and irreversibilities, but only reduces the total negative effect thereof. What is required is a blade design which weakens or eliminates the compression wave front to such a degree that separation of the airflow boundary layer at the suction surface of the rotor blade does not occur.

DISCLOSURE OF THE INVENTION

It is therefore an object of the present invention to provide a blade for a rotating fan wherein the relative velocity between the air and at least a portion of the blade is supersonic.

It is further an object of the present invention to provide a blade configured to avoid separation of the suction surface boundary layer during recompression of the air stream.

It is still further an object of the present invention to eliminate the compression wave front resulting from interaction of individual compression waves generated in adjacent blade segments.

According to the present invention, a rotating blade for inducing an axial static pressure rise resulting in a propulsive force is configured to achieve both the low noise generation of prior art designs and the high efficiency operation demanded by modern aircraft operators. High efficiency is achieved through configuring individual airfoil segments of the blade so as to minimize or eliminate the strong compression wave front occurring at the surface of prior art blades and which results in separation of the downstream air boundary layer from the suction surface of the blade. Boundary layer separation, particularly in lifting airfoil or propulsion blade applications, results in irreversible (and hence inefficient) gas flow and increased drag on the airfoil.

The blade according to the present invention avoids creating a strong compression wave front by locating the maximum camber points of individual blade airfoil segments such that the compression wave generated by any one segment of the rotating blade is not reinforced (and therefore not strengthened) by the compression wave generated by any other blade segment. By avoiding the intersection and reinforcement of the compression waves generated at any point along the blade span, the blade according to the present invention reduces or eliminates the boundary layer separation common in prior art blades operating at supersonic relative speeds.

More specifically, the location of maximum camber of the individual blade airfoil segments of the blade according to the present invention is located between the blade leading and trailing edges such that the compression wave occurring immediately downstream of the point of lowest static pressure of each blade segment is disposed within a Mach cone defined at the equivalent point of the upstream adjacent airfoil segment. The local effect of the recompressing air flow of each segment is thus swept back along the blade surface at a rate which prevents the compression wave generated at any one point on the blade from intersecting and thus reinforcing the pressure wave generated at any other point in the blade.

For those blades configured with swept leading edges for avoiding the generation of a leading edge shock wave, the line of maximum camber defined by the maximum camber points of the individual blade airfoil segments is similarly swept at least over those portions of the blade span which experience supersonic relative airflow velocities.

As rotating blades for gas turbine engine fans or prop fan applications typically taper in thickness and vary in chordal dimension with radially outward displacement, the blades according to the present invention have a varying proportional chordal displacement of the maximum camber point of each airfoil section over the span of the blade in order to achieve the swept compression wave described above. This represents a significant departure from prior art blade designs wherein a "family" of airfoil patterns are typically used to define the individual blade segments and which, although changing in relative thickness, chordal length, and maximum relative camber over the span of the blade, still retain a characteristic and nearly constant proportional displacement between the maximum camber point and the blade leading edge relative to the segment chord length. Such prior art blades thus create compression waves at each segment which intersect with compression waves generated by downstream segments resulting in an intensified compression wave front which in turn disrupts the airflow over the suction side of the blade surface and diminishes blade aerodynamic efficiency.

Both these and other objects and advantages will become apparent to those skilled in the art upon review of the following description and the appended claims and drawing figures.

DETAILED DESCRIPTION OF THE PREFERRED EMBODIMENT

Figure 1:
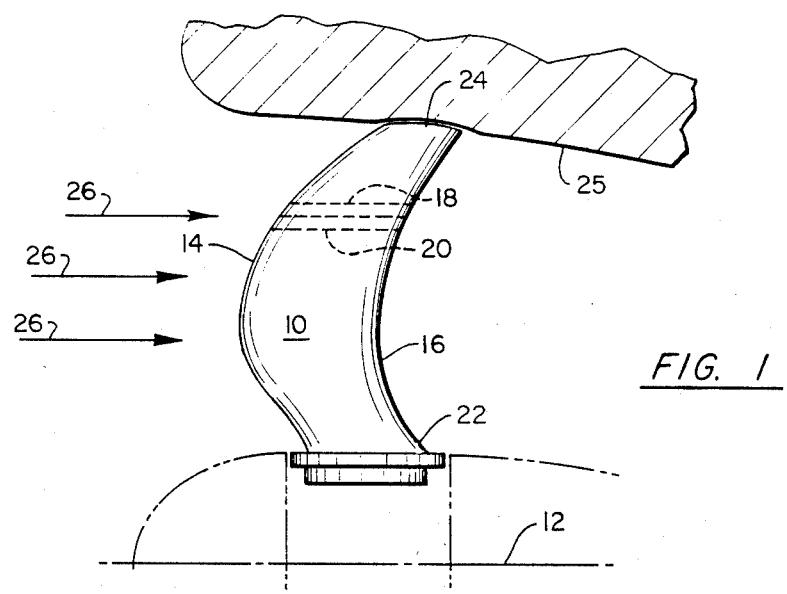
FIG. 1 shows a side view of a blade according to the present invention in the plane of the rotation axis.

FIG. 1 shows a side elevation of a fan blade rotating about a central axis 12. The blade 10 includes a swept leading edge 14, a trailing edge 16, and is comprised of a plurality of individual blade airfoil segments 18, 20 disposed between the radially inward root end 22 and the radially outward tip end 24. The fan is enclosed in an annular shroud or duct 25.

It should be noted that the blade segments 18, 20 represent arbitrary divisions of the blade 10 made for computational convenience when the blade performance and local airflow is analyzed by a finite difference numerical method or the like. The thickness of an individual segment or "slice" is thus dependent on the computational power of the analytical method employed, with the more powerful methods being typically able to accommodate a greater number of thinner segments and thus achieving a higher degree of overall accuracy as a result. An exact mathematical solution of the blade airflow would define the relationship between differential blade segments of infinitesimal thickness, however this type of solution has not yet been achieved for any but the most simple of airfoil arrangements. Current numerical methods of analysis are able to compute the local airflow conditions in 20 to 50 segments distributed radially over the blade span between the root and tip. Although discussed in terms of individual adjacent blade segments having a finite thickness, it is therefore to be understood that the term "segment" is intended to include the minimum computational "slice" of the overall blade consistent with the method of analysis employed.

FIG. 1 also shows an axially flowing stream of air 26 encountering the swept leading edge of the blade 14. The degree of sweep, both axial and circumferential, of the leading edge 14 is related to the relative velocity between the leading edge 14 and the air stream 26 and is such that the relative velocity component normal to the leading edge 14 is less than the sonic velocity under airflow conditions local to that point. Such designs are well known in the prior art and eliminate the formation of sonic shock waves at the leading edge of blades such as those shown in FIG. 1 which have at least a portion thereof operating in a supersonic flow regime relative to the corresponding air stream.

Figure 3:
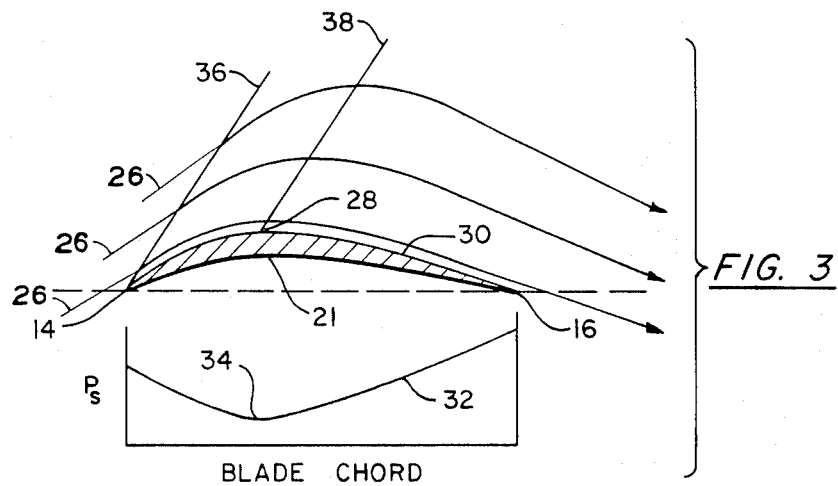
FIG. 3 shows a transverse cross section of a blade according to the present invention indicating both local air stream lines and the airfoil suction surface static pressure distribution.

As will be appreciated by reviewing FIG. 3 which shows a cross section 21 of airfoil segment 20. of the blade according to the present invention, the section 21 has a generally curved shape extending between the leading edge 14 and the trailing edge 16. The cross section 21 defines a curved or cambered volume having a point of maximum camber 28 located intermediate the leading and trailing edges 14, 16 on the suction or convex surface 30 of the airfoil segment 20.

As is well known in fluid theory and shown by curve 32 in FIG. 3, the static pressure of the airflow 26 over the blade segment 20 decreases as the airflow 26 is turned by contact with the segment 20 until the flow passes the point of maximum camber 28 at which time the airflow velocity begins to decrease and the gas stream recompresses as shown by curve 32. The point of minimum static pressure 34 also represents the local compression wave front initiated at the surface 30 of the airfoil segment 20.

As is also well known in the art of supersonic and compressible fluid flow, the effect of any perturbation in a supersonic flow regime is concentrated along a "Mach line" (or Mach cone in three-dimensional flow) which is a function of the Mach number of the flow stream according to the relationship $$\alpha = \text{arc sine } 1/M$$

wherein

M equals the Mach number of the flow stream, and
$\alpha$ equals the included half angle of the Mach cone.

Thus, for the two dimensional representation of FIG. 3, the perturbation effects of the leading edge 14 and maximum camber point 28 of the segment 20 are transmitted into the gas flow stream 26 along respective Mach lines 36, 38. Due to the nature of supersonic flow, not only is the effect of a flow perturbation not evident in the airstream 26 upstream of the respective Mach line 36, 38, but the disturbance caused by the surface perturbation 14, 28 is concentrated along the respective Mach line 36, 38. Thus, the increase in pressure or compression wave generated at the maximum camber point 28 for the airfoil segment 20 propagates to adjacent segments and into the airstream 26 principally along the Mach line or cone 38.

Figure 2A:
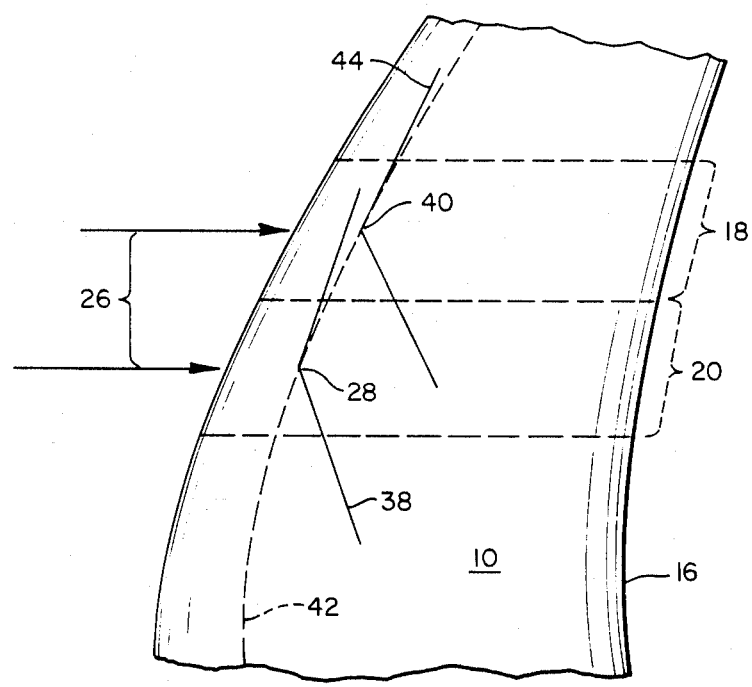
FIG. 2a shows a more detailed view of a blade according to the present invention indicating the location of the compression waves generated by individual blade segments.
Figure 2B:
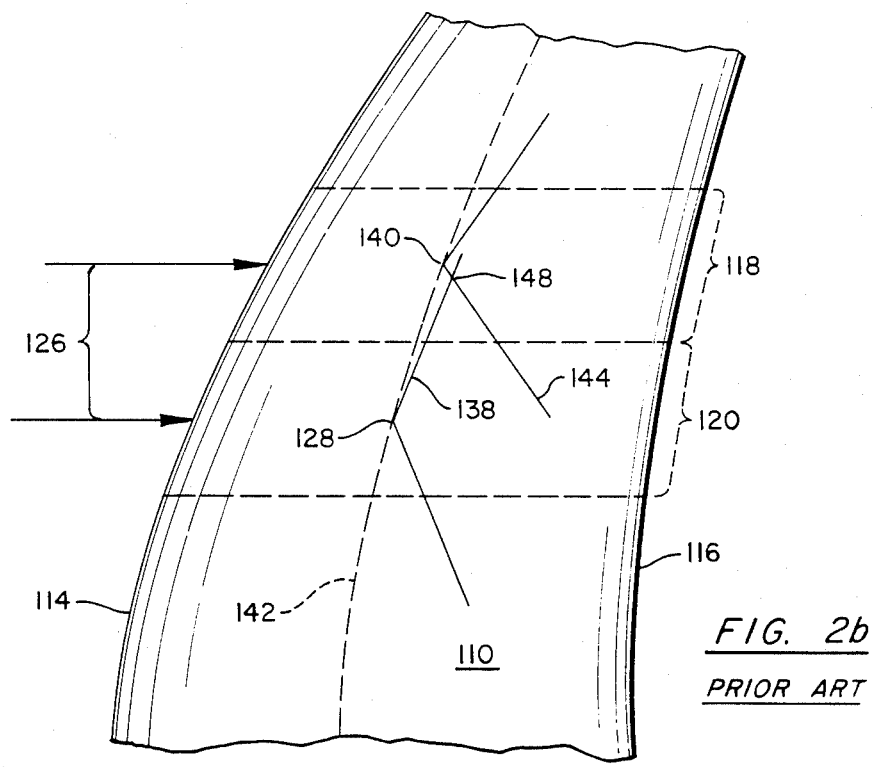
FIG. 2b shows a prior art blade wherein the compression waves generated by individual blade segments intersect and reinforce.

The significance of the foregoing discussion is best appreciated by reviewing FIGS. 2a and 2b in concert. FIG. 2a shows a detailed view of the segments 18, 20 of the blade 10 of FIG. 1. The maximum camber point 28 of the segment 20 and a similar maximum camber point 40 of segment 18, along with the maximum camber point of the other segments comprising the blade 10 define a maximum camber line 42 as shown in FIG. 2a. As discussed hereinabove, the maximum camber point 28 is related to the minimum static pressure point 34 occurring on the suction surface of the segment 20 as well as the initiation of the recompression of the air flow 26 flowing over that segment 20. The effects of this recompression propagate spanwise along the blade 10 along the Mach lines 38, 44 for the respective maximum camber points 28, 40.

The individual segments 18, 20 of the blade 10 according to the present invention are cambered responsive to the relative velocity of the airflow 26 and the Mach lines 38, 44 created at the maximum camber points 28, 40 such that the compression wave initiated at the maximum camber point 40 of segment 18 lies behind the Mach line 38 and hence the compression wave generated at point 28 on the upstream blade segment 20. The compression waves generated by each blade segment 18, 20 are thus swept behind the Mach lines of the adjacent upstream blade segment compression waves and do not intersect or reinforce each other.

This advantage is best appreciated by reviewing FIG. 2b wherein a prior art blade 110 having adjacent blade segments 118 and 120 experiences relative supersonic flow with respect to an airstream 126. The maximum camber points 128 and 140 of the respective segments 120 and 118 define a maximum camber line 142 as shown and are not arranged such that the downstream blade segment maximum camber point 140 is located behind the Mach line 138 originating at the maximum camber point 128. The effects of the compression waves generated at the maximum camber points 128 and 140 thus propagate along the Mach lines 138 and 144 as shown, intersecting at point 148 and forming a reinforced wave front behind the maximum camber line 142.

The intersection of the propagating compression waves from adjacent blade segments 118, 120 provides a reinforced and intense compression wave front immediately downstream of the maximum camber line 142 and results in a rapid jump in surface static pressure along the suction surface of the blade 110. Such a rapid pressure jump or shock wave adjacent the blade surface can disrupt and detach the downstream boundary layer and diminish the aerodynamic effectiveness of the local blade surface. The irreversibilities caused by the occurrence of such a shock wave and boundary layer detachment transfer energy from the rotating blade into the airstream 26 as nonuseful heat energy rather than the desirable airflow turning or static pressure rise achieved by the blade according to the present invention over the entire blade surface.

The swept maximum camber line 42 of the blade 10 according to the present invention would appear in most applications to be somewhat uniformly spaced from the leading edge 14 as it follows a similar design parameter. Since typical fan blades are formed of airfoil sections 18, 20 which vary with respect to chordal dimensions with increasing radius, the blade 10 according to the present invention is constructed of airfoil segments having a non-uniform proportional displacement between the maximum camber point and the leading edge with respect to the segment chordal dimension. This is a significant departure from prior art blade designs which are typically constructed of airfoil segments based upon a plurality of similar airfoil shapes or "family" wherein the location of the maximum camber point of each segment is a substantially constant proportion of the segment chordal dimension, thereby insuring that the maximum camber line 142 will not be uniformly spaced from the sonically swept leading edge 114.

It will be appreciated that the actual design and position of the maximum camber points 28, 40 and maximum camber line 42 of the blade 10 according to the present invention are located responsive to the local airflow over the particular segment under consideration and, although this may typically result in a substantially uniform spacing between the maximum camber line 42 and the leading edge 14, it does not in any way require such a relationship which is simply the likely result of the location of the maximum camber points 28, 40 so as to result in the non-intersection of the compression waves generated at each and every segment along the blade span.

This local airflow must be determined through the use of a three dimensional transonic flow analysis procedure rather than two dimensional modeling or cascade test data which does not accurately account for spanwise or radial flow induced by adjacent blade segments. Such three dimensional analysis techniques are particularly important near the blade tip where the blade camber distribution must be determined simultaneously with the shroud contour to avoid creating a coalescence of pressure waves leading either to a secondary shock, as described in the Bliss reference, U.S. Pat. No. 3,989,406 discussed above, or to a premature detachment of the boundary layer from the blade or shroud surfaces.

It will further be appreciated that the relationships between the adjacent segments as disclosed and described hereinabove are intended to only cover that portion of the rotating blade wherein the relative velocity between the moving blade and moving air stream is greater than the sonic velocity under local air temperature and flow conditions.

Although disclosed in terms of a rotating fan blade swept primarily rearwardly from the hub and to the tip end, the blade configuration according to the present invention is equally beneficially applicable to blades of forward sweep, reversing sweep, as well as ducted and unducted fan propulsion systems, inducers of centrifugal impellers, and prop fan blades. The foregoing discussion is therefore to be taken in an illustrative sense and shall not be construed as limiting the scope of the invention as defined solely by the claims recited hereinbelow.

I claim:

1. A fan blade rotating about a central axis at an angular velocity sufficient to result in a supersonic relative velocity between a portion of the blade and an axially flowing stream of air, including a leading edge, a trailing edge, a plurality of blade airfoil segments forming a suction surface extending between the leading edge and the trailing edge, each segment defining a point of maximum camber and a corresponding minimum static pressure point on the suction surface, the segments collectively defining a blade having a span extending from a radially inward root end to a radially outward tip end, and the points of maximum camber collectively defining a maximum camber line along the suction surface of the blade, characterized in that the line of maximum camber in that portion of the blade experiencing supersonic relative velocity is swept with respect to the airflow such that any one minimum static pressure point on the blade suction surface falls within a Mach cone defined at any other minimum static pressure point lying both on the blade suction surface and upstream of the one minimum static pressure point.

2. In a rotating blade for interacting with a stream of air flowing substantially parallel to the blade axis of rotation, the relative velocity between the airstream and at least a portion of the blade being supersonic, the supersonic portion of the blade further including a plurality of cross sectional airfoil span segments, each segment having a leading edge and a trailing edge, and interacting with the airflow stream to locally create a corresponding minimum static air pressure point on the suction surface of each airfoil span segment intermediate the leading and trailing edges thereof, wherein the improvement comprises:

each airfoil span segment being located with respect to the next downstream adjacent segment such that the leading edge point of the downstream segment falls within a first Mach cone defined by the leading edge of the adjacent upstream segment, and the minimum convex surface static air pressure point of the downstream adjacent segment falls within a second Mach cone defined at the minimum suction surface static air pressure point of the upstream adjacent segment.

* * * * *